Figure 3:
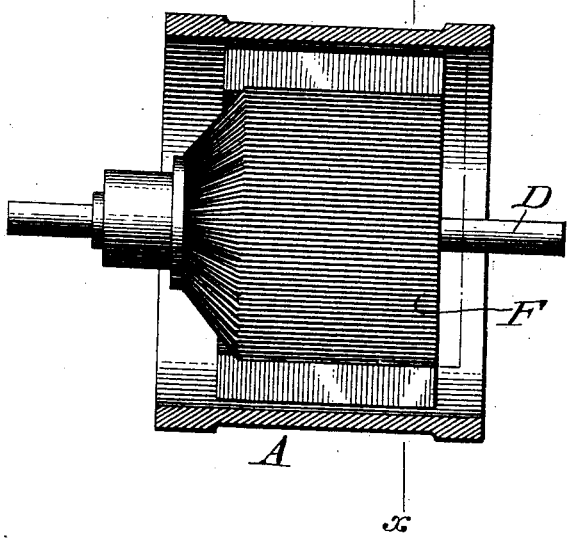

No. 708,875. Patented Sept. 9, 1902.
N. H. EDGERTON.
DYNAMO AND MAGNETO ELECTRIC MACHINE.
(Application filed May 23, 1902.)
(No Model.) 2 Sheets—Sheet I.
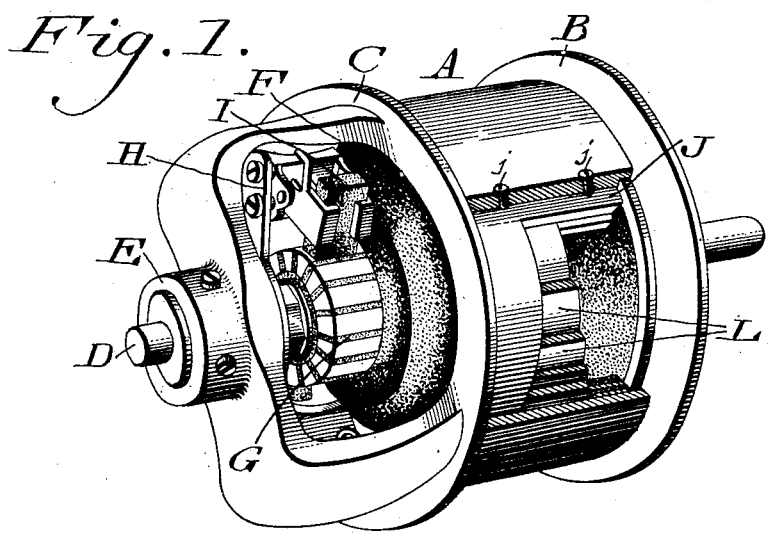
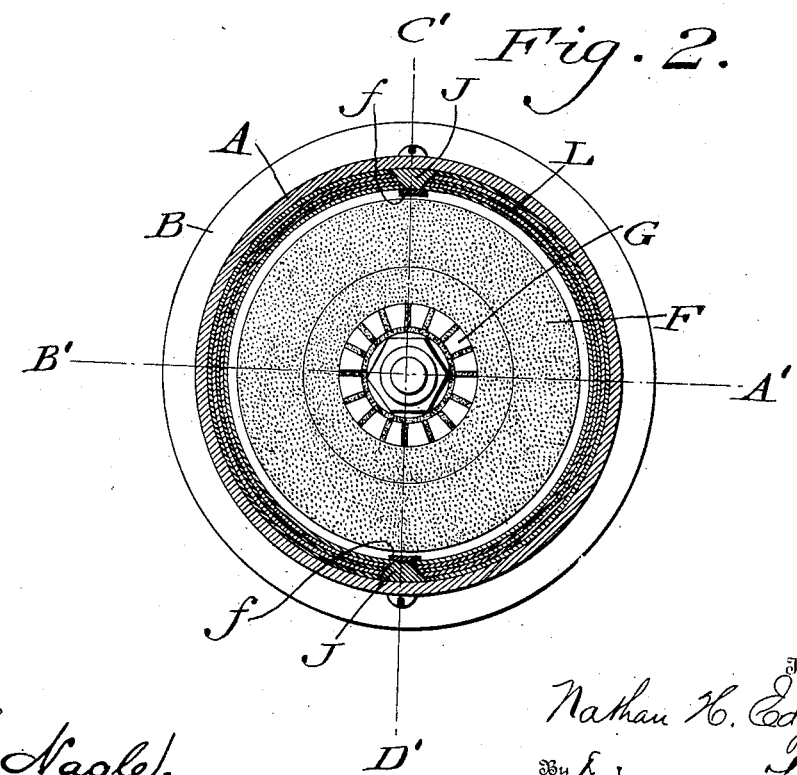

No. 708,875. Patented Sept. 9, 1902.
N. H. EDGERTON.
DYNAMO AND MAGNETO ELECTRIC MACHINE.
(Application filed May 23, 1902.)
(No Model.) 2 Sheets—Sheet 2.

Witnesses
P. H. Nagle.
L. Douville.

Inventor
Nathan H. Edgerton.
By Diederichein & Fairbanks
Attorneys

UNITED STATES PATENT OFFICE.

NATHAN H. EDGERTON, OF PHILADELPHIA, PENNSYLVANIA.

DYNAMO AND MAGNETO-ELECTRIC MACHINE.

SPECIFICATION forming part of Letters Patent No. 708,875, dated September 9, 1902.

Application filed May 23, 1902. Serial No. 108,704. (No model.)

*To all whom it may concern:*

Be it known that I, NATHAN HUNTLEY EDGERTON, a citizen of the United States, residing in the city and county of Philadelphia, State of Pennsylvania, have invented a new and useful Improvement in Dynamo and Magneto-Electric Machines, of which the following is a specification.

My invention relates to improvements in dynamo and magneto-electric machines; and the object of my invention is to construct the field of a magneto-electric machine in such a manner as to prevent as far as possible magnetic nodes in the field-magnets, and also to control the magnetic density of the field for the purpose of intensifying its inductive action, and, further, to produce motors and dynamos of cheaper construction and simpler mechanism in both the electromagnetic types and magneto-electric types; and it consists especially in the electromagnetic machine in eliminating from the machine the heavy wire-wound pole-pieces and cores now used in the ordinary construction of electric machines, and in the magneto-electric machine it consists in so arranging the magnets that the current flowing through the armature intensifies the electric value of the field-magnets. To do this, I place the laminated field of the one machine in such position that the windings of the armature-circuit cross the laminæ of the field at right angles thereto, forming an electromagnet with two poles in a bipolar machine and in a multipolar machine forming magnets of any number desired. This construction is actually using the windings of the armature to replace the copper-wire windings of the field-magnets in the ordinary type of dynamo, and it is evident on inspection that the magnetization of the laminated field can be held as permanent and the magnetic strength maintained as easily as in the old style of machine, because no matter at what speed the armature is running there will be the same number of convolutions acting upon each half of the field-magnet as if the armature were standing at rest, and the increase in magnetization can be effected by varying the armature-turns as in the ordinary dynamo-machine. In the construction of the magneto-electric machine the same general arrangement is adopted, so as to obtain from the current generated and flowing through the armature an increase in the magnetic force at the magnetic poles. It makes no difference to this magneto-electric machine whether it is used for a motor or a dynamo, as the reaction between the armature and the laminated field is the same and the fields will build up under the action of the current generated by the laminated field, giving a still higher effect than can be obtained from any other form or manner of disposing the laminated field around the armature; and it consists, essentially, in making the inductive field of any suitable number of magnets, made either of steel or soft iron, suitably constructed and held in place, as hereinafter more particularly explained.

Any armature can be used with my machine, provided the windings of the same are parallel to the armature-shaft, and therefore at right angles to the laminated field. Therefore it will be understood that the windings of the armature shown in the drawings are at right angles to the laminated field.

I may use for the laminated field either soft iron, such as Norwegian or Russian iron, or else permanent steel magnets. It will of course be understood that the frame of the machine which incloses the fields is of diamagnetic material, such as aluminium or the like, thereby isolating each field from the other. In each case by revolving the windings of the armature and cutting the flux of the laminated steel at right angles by said windings the said laminated field reacts from the armature-current, so that the inductive action of the field-magnets is increased. It is well known that there is in soft iron what is known as "residual magnetism;" but these said magnets are far too weak to be of any use as ordinarily used in work requiring strong magnets. (I am now speaking of electromagnets. I am speaking of soft iron used as I intend to use same, without any wire wound around or encircling same.) Now by cutting the flux of said soft-iron magnets in substantially the manner described (this flux is caused by the residual magnetism in said magnets, no matter how weak) at right angles by the armature-windings the said soft-iron magnets react from the armature-current, and thus have their inductive power increased. This I claim to be new and patentable.

Figure 4:
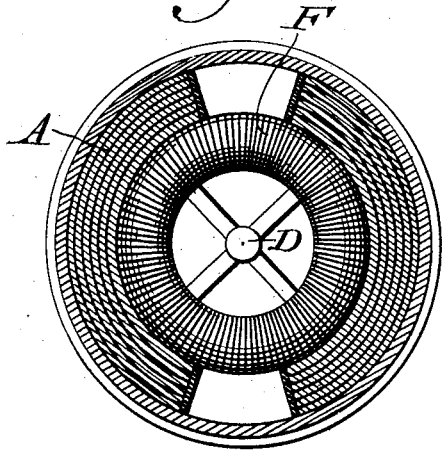

Figure 1 is a perspective view of the magneto-electric machine, parts broken away, showing the laminated magnets which form the field thereof. Fig. 2 is a cross-section through the frame of the machine and the laminated magnets, showing the position of the laminæ and a manner of securing them in place. Fig. 3 is a view showing the windings of the armature running parallel with the armature-shaft. Fig. 4 represents a section on line $x\, x$, Fig. 3.

In the drawings like letters of reference indicate corresponding parts in each figure.

A is the main frame of the machine, made of diamagnetic material, and B and C the end supports of the same, said supports being also of diamagnetic material.

D is the armature-shaft, which is supported in suitable bearings, such as E, forming part of the end supports B and C of the machine. One of the bearings E only is shown.

F is the armature, and G the commutator. Although I have not shown the specific construction of the armature used in my machine, it will be understood that I can use any type of armature the windings of which are parallel to the armature-shaft, consequently being at right angles to the laminated field, as will be understood from Figs. 3 and 4.

H represents the brush-holders, and I the brushes.

Resting against the inside of the frame A and suitably supported in position by their ends abutting the retaining-bars J (which are secured by screws $j$ to the main frame A or forming part thereof) are a number of laminated magnets L, made either of Norwegian or Russian soft iron or of steel. These magnets form the field of the machine. The said magnets are semicircular in shape, as shown, and are placed one upon the other, as will be seen from the drawings. It takes three laminæ placed side by side to extend the width of the field in the machine shown in the drawings; but it will of course be understood that I can make the said laminæ the whole required width of the field and not depart from the spirit of my invention or use any number of laminæ of a desired width for the field. The laminæ placed near the armature F have their ends overlapped by the edges of the plates $f\, f$, as shown, which are secured to or form part of the piece of diamagnetic material, as shown. This construction securely holds the laminæ in place and also permits of their speedy removal when necessary. It will of course be understood that the plates $f\, f$, secured to or forming part of the pieces of diamagnetic material J, are also made of the same diamagnetic material as the pieces J.

I have found that by laminating the field in the manner described I can eliminate the magnetic nodes, which have heretofore lessened the efficiency of permanent magnets to such a degree as to make it impracticable to use them. It will of course be understood that as the number of laminated magnets is increased in the field the efficiency of the machine is increased.

Referring to Fig. 2 of the drawings, it will be conceived that if a line be drawn from A' to B' the armature will be cut into two equal segments. These segments will at all times, whether rotating or standing still, have the same number of wires on the sides A' D' B' as on the sides A' C' B', and these wires so cut or traverse the field-magnets with a current flowing through them will produce an electromagnetic result in proportion to the amount of current so passed through them, or, in other words, to the number of ampere-turns traversing to what is to all intents and purposes the field-circuit, although that circuit revolves with the armature. For instance, if a current flowing through the armature having its entrance at A' and its exit at B' when ten amperes are flowing has a total result of ten thousand ampere-turns it will produce a certain magnetic force at C' and at D'. Now if this current of ten amperes be increased to twenty we would have a result of twenty thousand ampere-turns with double the magnetic moment at C' and D', and this will always be the same, whether the armature is rotating or is held at rest, because though the armature revolves, and no matter how fast it revolves, there is still in each segment of the armature the same number of ampere-turns acting upon the field-magnet, making what is called a "dynamo-machine," or an electromagnetic machine if soft-iron laminæ are used, and if permanent steel magnets are used a magneto-electric machine with an inductive field acting through the magnets to increase their magnetic moment in addition to the magnetism held permanently by the said magnets.

It should also be understood that I do not limit myself to piles or groups of laminated iron plates or steel plates; but the plates may be cut into circular segments and be placed edgewise in the plane of rotation, or they may be made of rods or wires so grouped about the armature as to be actuated by the current flowing through the armature-coils.

Having thus described my invention, what I claim as new, and desire to secure by Letters Patent, is—

1. In an electric machine, the combination of an isolated field magnet or magnets, composed of soft iron, energized or intensified from or by the current flowing through the armature-coils, with an armature embraced by said magnets and having its windings parallel with its shaft.

2. The combination with segregated fields of soft iron, energized by currents flowing through the armature-circuit only, of an annular inclosing frame of diamagnetic material, and an armature within said magnets having its windings parallel with its shaft, and at right angle to the laminated field.

3. In an electric machine, the combination of an isolated field magnet or magnets, composed of soft iron energized or intensified from or by the current flowing through the armature-coils, with an armature embraced by said magnets in a shell of diamagnetic material, and having its windings parallel with its shaft.

NATHAN H. EDGERTON.

Witnesses:
JOHN A. WIEDERSHEIM.
C. D. McVAY.